United States Patent [19]

Wirnowski

[11] Patent Number: 4,488,158

[45] Date of Patent: Dec. 11, 1984

[54] ELECTROSENSITIVE RECORDING MEDIUM

[75] Inventor: Richard C. Wirnowski, Longwood, Fla.

[73] Assignee: Exxon Research & Engineering Co., Florham Park, N.J.

[21] Appl. No.: 547,855

[22] Filed: Nov. 2, 1983

Related U.S. Application Data

[63] Continuation of Ser. No. 341,676, Jan. 22, 1982, abandoned.

[51] Int. Cl.[3] .......... G01D 15/34

[52] U.S. Cl. .......... 346/135.1; 346/165; 428/480

[58] Field of Search .......... 346/135.1, 162-165; 428/480, 420; 204/2

[56] References Cited

U.S. PATENT DOCUMENTS

| | | | |
|---|---|---|---|
| 2,664,044 | 12/1953 | Dalton | 346/135.1 X |
| 3,511,700 | 5/1970 | Miro | 346/1.1 X |
| 3,786,518 | 1/1974 | Atherton | 346/135.1 X |
| 3,920,873 | 11/1975 | Diamond | 346/163 X |
| 4,012,292 | 3/1977 | Fujiwara | 346/135.1 X |
| 4,042,936 | 8/1977 | Yoshikawa | 346/135.1 X |
| 4,082,902 | 4/1978 | Suzuki | 346/135.1 X |
| 4,206,017 | 6/1980 | Robillard | 346/165 X |
| 4,208,467 | 6/1980 | Coney | 428/480 |
| 4,308,314 | 12/1981 | Nakano | 346/135.1 X |
| 4,400,706 | 8/1983 | Takemura | 346/135.1 |

*Primary Examiner*—Joseph W. Hartary

[57] ABSTRACT

An electrosensitive recording member comprising, in combination, (1) a base support; (2) a conductive polyester layer disposed on the base support; and (3) a contrasting surface recording layer with respect to said polyester layer and combustible at the temperature developed during passage of marking current through said medium to selectively reveal the underlying contrasting polyester layer. The polyester layer is stable and not subject to depolymerization when subjected to the marking temperatures of an electronic recording member, e.g., stylus.

21 Claims, 2 Drawing Figures

ELECTROSENSITIVE RECORDING MEDIUM

This is a continuation, of application Ser. No. 341,676, filed Jan. 22, 1982 abandoned.

BACKGROUND OF THE INVENTION

1. Field of the Invention

This invention is in the field of electrical recording media for various data, message and graphic imaging devices. More particularly, this application relates to improvements in the preparation of electrosensitive recording media or sheets and products produced thereby and commonly referred to as "spark-recording", "burn-off" or "electrosensitive recording" papers, films and foils, having a plurality of layers that are arranged in such a manner that recording is achieved by the local destruction of the required recording layer or layers by means of an electrical signal passing through a stylus, spark discharge or other electronic recording member in contact with the surface of the recording medium or sheet.

2. Description of the Prior Art

The recording of electrical signals as an image has significantly increased in recent years due to the wide acceptance of facsimile and other telecommunication devices. Recording is generally accomplished on a recording medium or sheet that is regarded as being "surface conductive" or "front grounding" because the current being passed therethrough enters and exits through one of the upper layers of the recording media due to the presence of a plain paper, film or other insulating substrate. Where a conductive paper, foil or other low resistance substrate is used, the recording media or sheet is regarded as being "through conductive" or "back grounding" because the current path travels entirely through the recording media.

The nature and preparation of "front grounding" and "back grounding" recording media or sheets are well-known in the art as exemplified by Miro in U.S. Pat. No. 3,511,700 and Diamond in U.S. Pat. No. 3,920,873.

One of the serious drawbacks in using conventional recording mediums relates to the generation of emissions of known sensitizing or otherwise harmful agents, e.g., n-butyl methacrylate monomers, which may cause rashes or other possible allergic reactions to humans. These generations are the result of the contact that takes place between a stylus or other spark discharge device and the top surfaces of existing recording sheets, during a recording operation.

In view of the problems existing in the art and discussed herein, a need therefore exists for a recording media or sheet that exhibits reduced smoke, odor and emissions during recording operations as well as a product that exhibits an improved recording or imaging density subsequent to the recording operation.

It is therefore a significant object of the present invention to significantly reduce and eliminate the unpleasant emissions associated with electrosensitive recording media or sheets during the recording process.

SUMMARY OF THE INVENTION .

The present invention relates to an electrosensitive recording member comprising: (1) a base support; (2) a conductive polyester layer on said base support; and (3) a contrasting surface recording layer with respect to said polyester layer and combustible at the temperature developed during passage of marking current through said medium to selectively reveal the underlying contrasting polyester layer and wherein said polyester layer is stable when subjected to said marking temperature.

DETAILED DESCRIPTION OF THE PRESENT INVENTION

Figure 1:
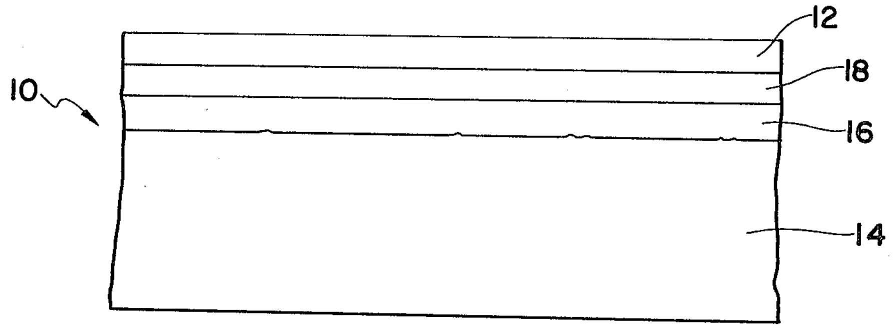
FIG. 1 is an enlarged cross-sectional and idealized view of a "surface-conductive" electrosensitive recording paper in accordance with this invention.
Figure 2:
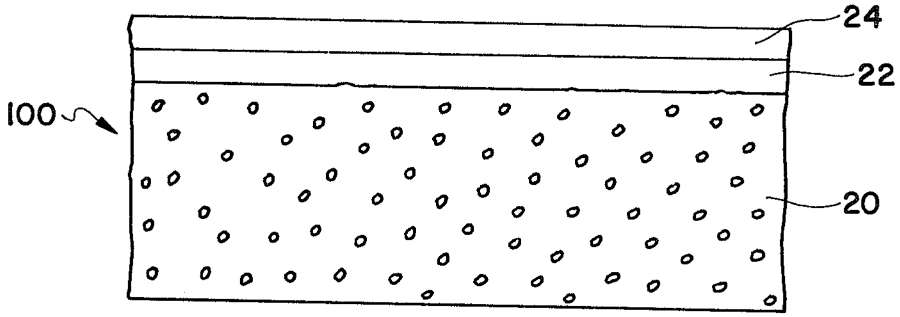
FIG. 2 is an enlarged cross-sectional and idealized view of a "through-conductive" electrosensitive recording paper in accordance with this invention.

Referring to FIGS. 1 and 2, of the drawings, recording sheets generally identified as 10 and 100, respectively, are illustrated. FIG. 1 illustrates a "surface-conductive" (or front conductive) recording medium or sheet that is generally carried on a rotating drum (not illustrated) during the recording process. During the recording process, a stylus needle or other conventional electronic recording means (not illustrated) is in light contact with the recording sheet and in particular, the surface recording layer 12 or 24. Recording layer 12 or 24 is removed or otherwise caused to disintegrate by the action of an electric discharge applied thereto by the electronic recording means in a manner well-known in the art.

Recording medium 10 comprises a base support 14 of relatively high resistivity (both volumetric and surface), a conductive "ground-coat" 16 on base support 14, a conductive polyester layer 18 that is preferably "dark", on layer 16, with a preferably contrasting, light-colored, surface recording layer 12 on layer 18.

During the recording operation, no current flows into base member 14 because it is electrically insulating or non-conductive and generally exhibits a surface resistivity greater than $1\times10^7$ ohms per square cm. when measured at standard conditions of 73° F. and 50% RH (relative humidity). Useful base members include, in sheet form, paper such as "bond" paper or other high quality papers, plastic film, e.g., acetate film, vinyl chloride film, polyethylene film or polyester film, or a laminated sheet of a paper and a plastic film, as well as synthetic papers generally formed by combining a synthetic resin and cellulosic fibers. The thickness of base member 12 is generally between 1.0 and 2.0 mils for plastic films; generally between 2.5 and 3.0 mils for paper; and up to 8 mils for cardboard or tag stock. It is understood that thicknesses greater or lesser than the aforementioned values may be employed provided that the base member provides satisfactory support for the recording medium as a whole and that the base member is sufficiently insulating and does not permit the electric charge applied to the recording medium to pass through base member 14.

Layer 16 is an electrically conductive layer exhibiting a maximum resistivity of about 1,500 ohms per square centimeter and preferably in the range between 50 and 1,500 ohms per square centimeter. Generally, this layer consists of conductive particles, e.g., carbon blacks, dispersed in a suitable binder, the carbon blacks accounting for the conductivity as well as the dark color of this layer. In addition to carbon blacks, other conductive particles that may be dispersed in a resin matrix include other carbons and well-known conductive metals having a specific resistance of not more than $2\times10^{-4}$ ohm-cm, preferably not more than $2\times10^{-5}$ ohm-cm.

The metal powders include not only powders of metallic elements, but also powders of alloys of two or more metals and of products obtained by coating highly conductive metals with metal powders having low conductivity. Examples of suitable metal powders are metal elements such as copper, aluminum, zinc, and iron, alloys of at least two metal elements such as stainless steel, brass and bronze and a copper powder coated with silver. Some conductive metal-containing compounds can also be dispersed in the resin matrix and they may include, e.g., cuprous iodide. The carbon blacks are most preferred for a resin matrix.

The resistivity of this layer and other layers of the recording medium discussed herein represents the surface resistance (unless otherwise identified) and is measured in accordance with Dalton, U.S. Pat. No. 2,664,044.

The conductive metal powder can be dispersed in a resin in an amount which makes it possible for the resulting metal-containing resin to have the above-specified surface resistance. The amount of the conductive powder can therefore be varied widely according to the type, particle diameter, shape, etc. of the metal. Generally, the amount of conductive particles is at least 50 parts by weight, preferably 50 to 600 parts by weight, more preferably 200 to 400 parts by weight, per 100 parts by weight of the resin.

The resin which constitutes the resin matrix in which the conductive particles are dispersed may be any thermoplastic or thermosetting resin which has film-forming ability and electrical insulation. Generally, the matrix resin preferably has a great ability to bind the conductive particles and can be formed into sheets or films having high mechanical strength, flexibility and high stiffness.

Examples of suitable resins that can be used in this invention are thermoplastic resins such as polyolefins (such as polyethylene or polypropylene), polyvinyl chloride, polyvinyl acetal, cellulose acetate, polyvinyl acetate, polystyrene, polymethyl acrylate, polymethyl methacrylate, polyacrylonitrile, thermoplastic polyesters, polyvinyl alcohol, gelatin, methyl cellulose, hydroxyethyl cellulose, carboxymethyl cellulose; and thermosetting resins such as thermosetting polyesters, epoxy resins, and melamine resins. The thermoplastic resins are preferred, and polyethylene, polyvinyl acetal, cellulose acetate, thermoplastic polyesters, and polyvinyl chloride are especially preferred.

As is conventional in the art, additives such as plasticizers, fillers, lubricants, stabilizers, antioxidants or mold releasing agents may be added as needed to the resin in order to improve the moldability, storage stability, plasticity, tackiness, lubricity, etc., as well as coloring substances or pigments for the purpose of imparting a desired color thereto in this layer and layer 18.

Layer 16, having the aforementioned composition may be laminated on layer 14 of an electric discharge recording material as a bonded layer, or a separate independent layer to be superimposed in a film or sheet form on layer 14 of the recording material. The thickness of this layer is not critical, and can be varied over a wide range. Generally, the thickness is preferably 0.3 to 1.0 mils.

The thickness of the conductive resin layer 16 is not critical, and can be varied over wide ranges in accordance with the desired use of the final product. Generally, conductive resin layer 16 is at least 0.1 mil and preferably between 0.2 and 0.6 mil thick.

Conductive layer 16 may also be a vacuum-deposited metal layer. Specific examples of a metal that can be deposited include aluminum, zinc, copper, silver and gold. Of these metals, aluminum is the most suitable. The thickness of the vacuum-deposited metal layer is not critical but generally is at least 300 Å and generally between 600 and 1,000 Å thick. In accordance with conventional vacuum deposition techniques, the metal can be deposited onto layer 14.

According to another embodiment of this invention, layer 16 may also be a thin metal foil, for example, an aluminum foil. It can be applied to one surface of base layer 14 by such conventional means as bonding or plating. Such metal layers generally have a surface resistance of from about 0.5–50 ohms per square centimeter.

The top coat or masking coat 12 is typical of the conventional masking coats used in the production of electrosensitive recording mediums. The top coat 12 generally consists of a mixture of a whitish pigment, e.g., zinc oxide, blanc fixe (precipitated barium sulfate) zinc sulfide, titanium dioxide, barium sulfate, lithopone, etc., in a resin binder, e.g., cellulose acetate butyrate, polyvinyl butyral, polyvinyl acetate copolymers, cellulose nitrate, polyethylene, ethyl cellulose as well as aqueous dispersion resins of various types, including those already mentioned herein. The surface resistance of this layer is generally between $1\times10^{6}$ and $1\times10^{11}$ ohms per square centimeter.

In prior known electrosensitive recording mediums, as well as the subject recording medium of the present invention, the contrast between the marked and unmarked areas is achieved substantially entirely by the presence of the whitish or light-colored pigment in the masking coat 12 which masks the rather dark or contrasting color in layer 16 which becomes exposed when the recording medium is subjected to the action of an electric discharge marking device in the form of a minute arc, spark or corona discharge.

Between the top coat or masking coat 12 and conductive layer 16 is a conductive polyester layer 18. Layer 18 is stable and does not depolymerize when subjected to the localized build-up of heat associated with the marking of the surface of the electrosensitive recording medium. Suitable polyesters for the practice of this invention that do not depolymerize when subjected at such marking temperatures which are generally in the range of about 1200° F., for very short periods of time, include polyesters derived from di- and tricarboxylic acids and dialcohols. Preferred di- and tricarboxylic acids contain from 3 to 10 carbon atoms and include, e.g., phthalic acid, isophthalic acid, terephthalic acid, trimellitic acid, malonic acid, succinic acid, glutaric acid, adipic acid, maleic acid, fumaric acid and sebacic. It is understood that the corresponding anhydrides of these acids may also be used in the formation of the desired polyesters.

Preferred dialcohols are glycols generally containing between 2 and 15 carbon atoms and include, for example, ethylene glycol, propylene glycol butane diol 1,5-pentanediol, 2-3-dimethyl-2,3-butanediol, 2,3-dimethyl-2,3-butanediol, 2,2-dimethyl-1,3-propanedoil, hexane diol, 4-methyl-2,4-pentanediol, 2,2,4-trimethyl-1,3-pentanediol and bisphenol A [2,2-bis(4-hydroxyphenol)propane]. Generally, the polyesters used in the practice of this invention exhibit a softening point in the range of 45° to 110° C. as determined by a differential scanning calorimeter. Preferred polyesters useful in the practice of this invention are polyesters derived from propylene glycol and isophthalic acid and having a molecular weight in the range of 1,500 and 12,000, and preferably between 5,000 and 9,000. Best results are achieved with the polyester having a molecular weight between about 6,000 and 8,000.

Layer 18, like layer 16, is conductive as noted hereinbefore, the conductivity generally being due to the dispersion of conductive material throughout this layer. The conductive particles employed in this layer are the same as employed in layer 16, with carbon black being particularly preferred. Carbon particles are generally employed in an amount between 8 and 40%, and preferably between 12 and 25% by weight of the polyester layer. It is understood that these ranges will vary slightly, just as in other layers, with the type of carbon particles employed due to the slight differences in conductivity of various types of carbon particles. Generally, the surface resistivity of layer 18 is generally between 500 and 15,000, and preferably between 1,000 and 5,000 ohms per square centimeter.

With reference to the electrosensitive recording medium 100 illustrated in FIG. 2, this recording medium differs from the recording medium of FIG. 1 in that the base support 20 is a conventional conductive base support generally comprising paper, synthetic paper or synthetic resin which generally contains conductive carbon although other conductive particles may be dispersed therein. This layer is generally between 2.5 and 4.0 mils thick and exhibits a surface resistivity of between about 50 to 1,500 ohms/cm$^2$. It is noted that the use of a conductive base support 20 in an electrosensitive recording medium is desired when rear grounding of the recording medium is desired and should be compared to the front grounding recording medium of FIG. 1 wherein the base support layer 14 does not contain any conductive materials dispersed therein, but does contain an additional conductive layer 16.

When a conductive base support is used, this support should provide support for the product as a whole. The term "synthetic paper" as used herein refers to sheets of paper containing cellulosic fibers in combination with synthetic resin fibers or fillers wherein the sheets exhibits much of the same properties of ordinary paper except that a portion of cellulosic fibers have been substituted with synthetic resin materials.

Layer 22 is a conductive polyester layer that corresponds to and is essentially the same as layer 18, of recording medium 10, both with respect to properties and formulation. In addition, recording medium 100 further comprises a top coat or masking coat 24 that is essentially the same as top coat or masking coat 12, of recording medium 10.

The various recording mediums of the present invention contain a plurality of layers, each of which differs in electrical conductivity such that the conductivity of each of the layers varies transversely and progressively through each adjacent layer over the thickness of the recording medium as a whole, as taught in Dalton, U.S. Pat. No. 2,644,044, and others.

What is claimed is:

1. An electrosensitive recording member comprising:

(1) a base support;

(2) a conductive polyester layer on said base support wherein said polyester is derived from (1) di- or tricarboxylic acid or anhydride, or mixtures thereof, and (2) dialcohols; and (3) a contrasting surface recording layer with respect to said polyester layer and removeable at the temperature developed during passage of marking current through said medium to selectively reveal the underlying contrasting polyester layer that does not depolymerize when subjected to said marking temperatures during the marking process.

2. The electrosensitive recording member of claim 1 wherein said base support is paper.

3. The electrosensitive recording member of claim 2 wherein said conductive polyester layer comprises a polyester in combination with conductive particles dispersed throughout said polyester, said polyester having a molecular weight between 1,500 and 12,000 and a softening point in the range of 45° to 110° C.

4. The electrosensitive recording member of claim 3 wherein said di- or tricarboxylic acid or anhydride contains from 3 to 10 carbon atoms and said dialcohol contains from 2 to 15 carbon atoms.

5. The electrosensitive recording member of claim 4 wherein said polyester is derived from propylene glycol and isophthalic acid.

6. The electrosensitive recording member of claim 5 wherein said conductive particles are carbon black.

7. The electrosensitive recording member of claim 6 comprising carbon black in an amount between 8 and 40% by weight of the polyester layer.

8. The electrosensitive recording member of claim 7 wherein said carbon black is present in an amount between 12 and 25% by weight of the polyester layer.

9. The electrosensitive recording member of claim 8 wherein said contrasting surface recording layer comprises a resin binder and white pigment dispersed therein.

10. The electrosensitive recording member of claim 8 wherein said contrasting surface recording layer comprises a resin binder and pigment dispersed through said resin binder, said pigment selected from the group consisting of zinc oxide, blanc fixe, zinc sulfide, titanium dioxide, barium sulfate, lithopone, and mixtures thereof.

11. The electrosensitive recording member of claim 2 further comprising a conductive layer disposed between said conductive polyester layer and said base support wherein the electrical conductivity of each layer of the recording member varies transversely and progressively through each adjacent layer beginning with the base support up to and including the recording layer, said recording layer exhibiting the highest electrical conductivity of the layers of the recording member.

12. The electrosensitive recording member of claim 1 wherein said base support is electrically conductive.

13. The electrosensitive recording member of claim 12 wherein said base support comprises paper, synthetic paper or a synthetic resin in combination with conductive particles dispersed throughout said base in an amount sufficient to provide a surface resistivity between 50 and 1500 ohms per square centimeter.

14. The electrosensitive recording member of claim 13 wherein said conductive polyester layer comprises a polyester in combination with conductive particles dispersed throughout said polyester, said polyester having a molecular weight between 1,500 and 12,000 and a softening point in the range of 45° to 110° C.

15. The electrosensitive recording member of claim 14 wherein said di- or tricarboxylic acid or anhydride contains from 3 to 10 carbon atoms and said dialcohol contains from 2 to 15 carbon atoms.

16. The electrosensitive recording member of claim 15 wherein said polyester is derived from propylene glycol and isophthalic acid.

17. The electrosensitive recording member of claim 16 wherein said conductive particles are carbon black.

18. The electrosensitive recording member of claim 17 comprising carbon black in an amount between 8 and 40% by weight of the polyester layer.

19. The electrosensitive recording member of claim 18 wherein said carbon black is present in an amount between 12 and 25% by weight of the polyester layer.

20. The electrosensitive recording member of claim 19 wherein said contrasting surface recording layer comprises a resin binder and white pigment dispersed therein.

21. The electrosensitive recording member of claim 20 wherein said contrasting surface recording layer comprises a resin binder and pigment dispersed through said resin binder, said pigment selected from the group consisting of zinc oxide, blanc fixe, zinc sulfide, titanium dioxide, barium sulfate, lithopone, and mixtures thereof.

* * * * *